United States Patent [19]

Edinger

[11] 4,156,702

[45] May 29, 1979

[54] ADHESION PROMOTED BLOCK COPOLYESTER COMPOSITION WITH MULTI-FUNCTIONAL CARBOXYLIC COMPOUND

[75] Inventor: John M. Edinger, Newark, Del.

[73] Assignee: E. I. Du Pont de Nemours and Company, Wilmington, Del.

[21] Appl. No.: 514,948

[22] Filed: Oct. 15, 1974

Related U.S. Application Data

[63] Continuation-in-part of Ser. No. 410,886, Oct. 29, 1973, abandoned.

[51] Int. Cl.$^2$ .............................................. C08L 67/02
[52] U.S. Cl. ................... 260/860; 260/45.7 P; 260/45.95 R; 260/26; 260/27 R; 260/873; 260/45.9 D; 528/273
[58] Field of Search ............... 260/873, 860, 26, 27 R, 260/63 R, 75 T; 528/273

[56] References Cited

U.S. PATENT DOCUMENTS

| | | | |
|---|---|---|---|
| 3,023,192 | 2/1962 | Shivers | 260/75 R |
| 3,076,789 | 2/1963 | Mochel et al. | 260/78 R |
| 3,459,584 | 8/1969 | Caldwell | 260/75 T |
| 3,484,339 | 12/1969 | Caldwell | 260/860 |
| 3,651,014 | 3/1972 | Witsiepe | 260/873 |
| 3,775,373 | 11/1973 | Wolfe | 260/75 R |
| 3,775,374 | 11/1973 | Wolfe | 260/75 R |
| 3,775,375 | 11/1973 | Wolfe | 260/75 R |
| 3,832,314 | 8/1974 | Hoh et al. | 260/75 R |

*Primary Examiner*—Harold D. Anderson

[57] ABSTRACT

Thermoplastic segmented copolyester elastomer consisting essentially of a multiplicity of recurring short chain ester units and long chain ester units joined through ester linkages, said short chain ester units amounting to 15 to 75 percent by weight of said copolyester and being derived from dicarboxylic acid such as an aromatic acid, e.g., terephthalic acid or a mixture of terephthalic acid and isophthalic acid, and an organic diol such as butanediol, and said long chain ester units amounting to 25 to 85 percent by weight of said copolyester and being derived from dicarboxylic acid such as an aromatic acid, e.g., terephthalic acid, or a mixture of terephthalic and isophthalic acids, and a long chain glycol such as polytetramethylene ether glycol, said copolyester having a melt index of less than 150 and a melting point of at least 90° C., modified with 0.75 to 20 parts by weight, per 100 parts by weight of elastomer, of a multi-functional carboxylic compound taken from the group consisting of aromatic and aliphatic anhydrides having at least two anhydride groups. The modified elastomer possesses improved adhesion particularly at high temperatures and under high applied stress. A useful adhesive composition comprises (A) 1 to 99 percent by weight of the segmented copolyester elastomer, and (B) 99 to 1 percent by weight of a compatible low molecular weight thermoplastic resin. The adhesive composition can contain stabilizers as well as other ingredients.

6 Claims, No Drawings

ADHESION PROMOTED BLOCK COPOLYESTER COMPOSITION WITH MULTI-FUNCTIONAL CARBOXYLIC COMPOUND

CROSS-REFERENCE TO RELATED APPLICATION

This application is a continuation-in-part of application Ser. No. 410,886, filed Oct. 29, 1973 and now abandoned.

BACKGROUND OF THE INVENTION

1. Field of the Invention

This invention relates to modified thermoplastic, segmented copolyester elastomers having improved adhesion properties, to blends of such modified elastomers with one or more compatible low molecular weight thermoplastic resins and to a method for preparing such blends.

2. Description of the Prior Art

Segmented copolyester elastomers and thermoplastic compositions containing such elastomers and low molecular weight thermoplastic resins are known.

In U.S. Pat. No. 3,832,314 there are disclosed thermoplastic compositions containing (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

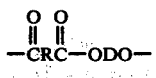

and said long chain ester units amounting to 25 to 85 percent by weight of said copolyester and being of the formula

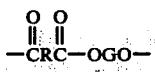

wherei R is the divalent aromatic radical remaining after removal of the carboxyl groups from aromatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 125° C. (DTA), and (B) 1 to 99 percent by weight of low molecular weight thermoplastic resin which forms compatible mixtures with the segmented copolyester, is thermally stable at 150° C., and has a melt viscosity of less than 10,000 centipoises at 200° C. Belgian Pat. No. 811,307 teaches soft thermoplastic segmented copolyester elastomer consisting essentially of a multiplicity of recurring short chain ester units and long chain ester units joined through ester linkages, said short chain ester units amounting to 15 to 50 percent by weight of said copolyester and being of the formula

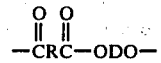

and said long chain ester units amounting to 50 to 85 percent by weight of said copolyester and being of the formula

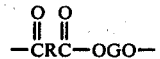

wherein R is the divalent aromtic radical remaining after removal of the carboxyl groups from aromatic dicarboxylic acid having a molecular weight of less than 350, said aromatic dicarboxylic acid being 55 to 95 percent by weight terephthalic acid, D is the divalent radical remaining after removal of the hydroxyl groups from butanediol, and G is the divalent radical remaining after removal of the terminal hydroxyl groups from polytetramethylene ether glycol having an averge molecular weight of 1500 to 3500, said copolyester having a melt index of less than 30 and a melting point of 90° to 160° C. (TMA).

The compositions of U.S. Pat. No. 3,832,314 have good bond strength as how melt adhesives and the compositions of Belgian Pat. No. 811,307 are particularly useful as pressure sensitive adhesives. In order to provide good adhesive properties, the viscosity of the adhesive blend must be maintained at a relatively constant level. It has been found that at elevated temperatures, particularly in the range of 170 to 200° C., over a period of several hours the aforementioned adhesive compositions lose viscosity and hence their bonding properties are reduced.

In U.S. Pat. No. 3,909,333 Eastman teaches that the aforementioned segmented copolyester elastomers can contain a stabilizer mixture, 1.75 to 15.0 percent by weight, based on the weight of elastomer, comprising (a) 0.25 to 2.5 percent by weight of a substantially linear polycarbodiimide having an average of at least two carbodiimide groups per molecule, and at least one compound of (b) 0.5 to 2.5 percent by weight of a hindered phenol, nitrogen-containing hindered phenol or secondary aromatic amine, (c) 0.5 to 5.0 percent by weight or phosphorous acid esters and (d) 0.5 to 5.0 percent by weight of an amino acrylate, a homopolymer thereof, or a random copolymer of ethylene and 20 to 40 percent by weight of amino acrylate compound, each of compounds (b), (c) and (d) being compatible with each other and with (a). Such stabilized elastomer compositions do not suffer appreciable loss in viscosity and have good pot life when heated to 170 to 200° C. for extended periods of time within the period of 12 to 24 hours.

Caldwell U.S. Pat. No. 3,459,584 teaches that tetracarboxylic acid dianhydrides, preferably pyromellitic acid dianhydride, can be reacted with certain low molecular weight hydroxyl-terminated polyesters to provide a prime coating composition. The polyesters are reacted with stoichiometric amounts of acid dianhydride. The polyester-dianhydride adducts contain about 1.2 to 15 weight percent free carboxyl groups and have a molecular weight of 400 to 8000. A related Caldwell U.S. Pat. No. 3,484,339 teaches that the reaction product of the tetracarboxylic acid dianhydride and low molecular weight polyester can be blended with particular polymers to provide, as disclosed, compositions with an improved degree of adhesion.

SUMMARY OF THE INVENTION

In accordance with this invention superior adhesion-modified thermoplastic segmented copolyester elastomers are provided which consist essentially of a multiplicity of recurring short chain ester units and long chain ester units joined through ester linkages, said short chain ester units amounting to 15 to 75 percent by weight of said copolyester and being of the formula

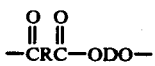

and said long chain ester units amounting to 25 to 85 percent by weight of said copolyester and being of the formula

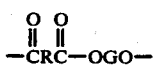

wherein R is the divalent radical, e.g., cyclic, aromatic, aliphatic, or mixtures thereof, remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 90° C. (TMA), modified with 0.75 to 20 parts by weight, per 100 parts by weight of elastomer, of a multi-functional carboxylic compound taken from the group consisting of aromatic and aliphatic anhydrides having at lest two anhydride groups.

In a preferred embodiment the adhesion modified elastomer is also stabilized with 1.75 to 15 parts by weight, per 100 parts by weight of elastomer, of a stabilizer mixture comprising (a) 0.25 to 2.5 parts by weight of a substantially linear polycarboiimide having an averge of at least two carbodiimide groups per molecule; and at least one compound taken from the group consisting of (b) 0.5 to 2.5 parts by weight of a compound taken from the group consisting of hindered phenols, nitrogen-containing hindered phenols and secondary aromatic amines; (c) 0.5 to 5.0 parts by weight phosphorous acid esters of the formula

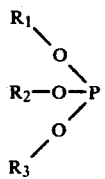

where $R_1$, $R_2$ and $R_3$ are $C_1$ to $C_{18}$ aliphatic, $C_6$ to $C_{15}$ aromatic, and combinations thereof; and (d) 0.5 to 5.0 parts by weight of an amino compound taken from the group consisting of amino acrylate of the formula:

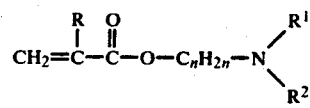

wherein R is hydrogen or methyl, $R^1$ is hydrogen or alkyl of 1 to 4 carbon atoms, $R^2$ is alkyl of 1 to 4 carbon atoms, and n is an integer of 1 to 4 inclusive, a homopolymer of said amino acrylate, and a random copolymer of ethylene and 20 to 40 percent by weight of said amino acrylate compound, each of compounds (b), (c) and (d) being compatible with each other and with (a).

In an embodiment the stabilizer mixture comprises (a) and at least two of the compounds (b), (c) and (d). Preferably the stabilizer mixture consists of compounds (a), (b), (c) and (d), each of the compounds being compatible with one another.

Improved modified, stabilized thermoplastic compositions are provided which comprise, based on the total thermoplastic components, (A) 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and consisting essentially of a multiplicity of recurring short chain ester units and long chain ester units joined through ester linkages, said short chain ester units amounting to 15 to 75 percent by weight of said copolyester and being of the formula

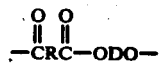

and said long chain ester units amounting to 25 to 85 percent by weight of said copolyester and being of the formula

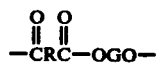

wherein R is the divalent radical, e.g., cyclic, aromatic or aliphatic, or mixtures thereof, remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point at least 90° C. (TMA); (B) 1 to 99 percent by weight of low molecular weight thermoplastic resin which forms compatible mixtures with the segmented copolyester, is thermally stable at 150° C., and has a melt viscosity of less than 10,000 centipoises at 200° C., modified with 0.3 to 8.0 parts by weight, per 100 parts by weight of elastomer and resin, of a multi-functional carboxylic compound taken from the group consisting of aromatic and aliphatic anhydrides having at least two anhydride groups and stabilized with (C) 0.75 to 6.0 parts by weight, per 100 parts by weight of elastomer and resin, of a stabilizer mixture comprising (a) 0.1 to 1.0 part by weight of a substantially linear polycarbodiimide having an average of at least two carbodiimide groups per molecule; and at least one compound taken from the group consisting of (b) 0.2 to 1.0 part by weight of a compound taken from the group consisting of hindered phenols, nitrogen-containing hindered phenols and secondary aromatic amines; (c) 0.25 to 2.0 parts by weight phosphorous acid esters of the formula:

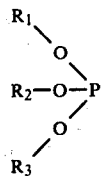

where $R_1$, $R_2$ and $R_3$ are $C_1$ to $C_{18}$ aliphatic, $C_6$ to $C_{15}$ aromatic, and combinations thereof; and (d) 0.20 to 2.0 parts by weight of an amino compound taken from the group consisting of amino acrylate of the formula:

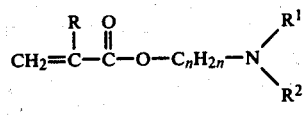

wherein R is hydrogen or methyl; $R^1$ is hydrogen or alkyl of 1 to 4 carbon atoms; $R^2$ is alkyl of 1 to 4 carbon atoms; and n is an integer of 1 to 4 inclusive, a homopolymer of said amino acrylate, and a random copolymer of ethylene and 20 to 40 percent by weight of said amino acrylate compound, each of said compounds (b), (c) and (d) being compatible with each other and with (a).

DETAILED DESCRIPTION OF THE INVENTION

The stabilized thermoplastic segmented copolyester elastomers used in the compositions of this invention consist essentially of 15 to 75 percent recurring short chain ester units and 25 to 85 percent long chain ester units joined through ester linkages. The term "consisting essentially of" as used herein, is meant to include in the copolyester only those unspecified polymer units which do not materially affect the basic and essential characteristics of the copolyester as it relates to the compositions of this invention. In other words, this term excludes unspecified polymeric units in amounts which prevent the advantages of the compositions of this invention from being realized. The term "short chain ester units", as applied to units in a polymer chain, refers to the reaction products of low molecular weight diols with dicarboxylic acids to form repeat units having molecular weights of less than about 550. These units are also referred to herein as "hard segments". The term "long chain ester units", as applied to units in a polymer chain, refers to the reaction products of long chain glycols with dicarboxylic acids. These units are also referred to herein as "soft segments". Preferably the copolyester consists essentially of 15 to 65 percent hard segments and 35 to 85 percent soft segments.

The soft thermoplastic segmented copolyester elastomers of this invention consist essentially of about 15 to 50 percent recurring short chain ester units and about 50 to 85 percent long chain ester units joined through ester linkages. In these elastomers the term "short chain ester units", as applied to units in a polymer chain, refers to the reaction of butanediol (BDO) with dicarboxylic acids. These units are also referred to herein as "hard segments". In these elastomers the term "long chain ester units", as applied to units in a polymer chain, refers to the reaction products of polytetramethylene ether glycol (PTMEG) with dicarboxylic acids. These units are also referred to herein as "soft segments". Preferably, the copolyester consists essentially of about 15 to 30 percent hard segments and about 70 to 85 percent soft segments.

The weight percent of long chain ester (LCE) units specified herein are calculated in accordance with the following equation in which both the numerator and denominator are expressed in grams.

Wt. % LCE = A + B − C/Theoretical Polymer Yield

A = (Moles of PTMEG) × (Mole Wt. of PTMEG)

B = (Total Moles of phthalate as Acid) × (Mole Wt. of phthalic Acid Mixture)

C = (Moles $H_2O$) × (Mole Wt. of $H_2O$)

In this equation the moles of phthalate will be the same as the moles of PTMEG and the moles of water will be twice that of PTMEG. The mole weight of the phthalic acid mixture should be a weighted average reflecting the composition of the mixture. The theoretical polymer yield will be the grams of ingredients put into the reaction minus the grams of by-product and excess ingredients distilled off. When cyclic, aliphatic or mixture of acids are used in preparing the long chain ester, B above equals (total moles of cyclic, aliphatic or mixtures of acids) × (weighted average mole weight of the total acid or mixture of acids).

The weight percent of short chain ester (SCE) units is defined in an analogous manner:

Wt. % SCE = D + E − F/Theoretical Polymer Yield

D = (Moles of BDO) × (Mole Wt. of BDO)

E = (Total Moles of phthalate as Acid) × (Mole Wt. of phthalic Acid Mixture)

F = (Moles $H_2O$) × (Mole Wt. of $H_2O$)

Here the moles of butanediol do not include any stoichiometric excess. When cyclic, aliphatic or mixture of acids are used in preparing the short chain esters E above is calculated as described for B.

The copolyesters used in accordance with this invention are prepared by polymerizing with each other (a) one or more dicarboxylic acids such as cyclic, aromatic, aliphatic dicarboxylic acids or mixture of said acids, preferably aromatic dicarboxylic acids, (b) one or more linear long chain glycols; and (c) one or more low molecular weight diols. The term "dicarboxylic acid", as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol. By the term "aromatic dicarboxylic acid" is meant a dicarboxylic acid in which each carboxyl group is attached to a carbon atom in an isolated or fused benzene ring or a ring which is itself fused to a benzene ring. Spcifically, in preparing the soft thermoplastic segmented copolyester elastomers (a) a mixture of aromatic dicarboxylic acids containing about 55 to 95 percent by weight of terephthalic acid, (b) polytetramethylene ether glycol and (c) butanediol are polymerized with each other.

The dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The dicarboxylic acids used in the preparation of the segmented copolyester are aromatic, cyclic (cycloaliphatic), aliphatic dicarboxylic acids of low molecular weight, or mixtures of said acids and can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$–$C_{10}$ alkyl, halo, alkoxy or aryl derivatives. Hydroxy acids such as p($\beta$-hydroxyethoxy) benzoic acid can also be used providing an aromatic dicarboxylic acid is also present.

Representative cycloaliphatic and aliphatic acids include sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis-(cyclohexyl) carboxylic acid, 3,4-furan dicarboxylic acid, and 1,1-cyclobutane dicarboxylic acid. Preferred acids are cyclohexane-dicarboxylic acids and adipic acid.

The preferred dicarboxylic acids for preparation of the segmented copolyester are the aromatic acids of 8 to 16 carbon atoms, particularly phenylene dicarboxylic acids such as phthalic, terephthalic and isophthalic acids. The most preferred acids are terephthalic acid and mixtures of terephthalic and isophthalic acids. In the soft copolyester elastomer, preferably, the mixture of aromatic dicarboxylic acids contains about 60 to 95 percent terephthalic acid.

The low molecular weight diols used in the preparation of the hard segments of the copolyesters have molecular weights of less than about 250. The term "low molecular weight diol", as used herein, should be construed to include equivalent ester-forming derivatives. In this case, however, the molecular weight requirement pertains to the diol only and not to its derivatives.

Suitable low molecular weight diols which react to form the short chain ester units of the copolyesters include acyclic, alicyclic and aromatic dihydroxy compounds. The preferred diols are those with 2 to 15 carbon atoms such as ethylene, propylene, tetramethylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, and the like. Especially preferred are the aliphatic diols of 2 to 8 carbon atoms. Suitable bisphenols include bis(p-hydroxy) diphenyl, bis(p-hydroxyphenyl) methane, bis(p-hydroxyphenyl) ethane, bis(p-hydroxyphenyl) propane and 2,2-bis(p-hydroxyphenyl) propane. Equivalent ester-forming derivatives of diols are also useful. For example, ethylene oxide or ethylene carbonate can be used in place of ethylene glycol.

The long chain glycols used to prepare the soft segments of these copolyesters have molecular weights of about 350 to 6000, and preferably about 600 to 3000. Preferably the long chain glycols have melting points of less than about 55° C., and carbon atoms to oxygen atom ratios which are greater than about 2.5, that is, greater than about 2.5:1. Long chain glycols having carbon to oxygen ratios greater than about 2.5:1 generally have less swell in water and greater resistance to hydrolysis.

The chemical structure of the long chain polymeric part of the long chain glycol is not critical. Any substituent groups which do not interfere with the polymerization reaction to form the copolyester can be present. Thus, the chain can be a single divalent acyclic, alicyclic, or aromatic hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain glycols used to prepare the copolyesters should be terminal groups to the extent possible.

Suitable long chain glycols which can be used in preparing the soft segments of the copolymers include poly(alkylene ether) glycols in which the alkylene groups are of 2 to 9 carbon atoms such as poly(ethylene ether) glycols, poly(1,2- and 1,3-propylene ether) glycol, poly(1,2-butylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and random or block copolymers thereof, for example, glycols derived from ethylene oxide and 1,2-propylene oxide.

Glycol esters of poly(alkylene oxide) dicarboxylic acids can also be used as the long chain glycol. These glycols may be added to the polymerization reaction or may be formed in situ by the reaction of a dicarboxymethyl acid of poly(alkylene oxide) such as HOOCCH$_2$(OCH$_2$CH$_2$CH$_2$CH$_2$)$_x$OCH$_2$COOH with the low molecular weight diol, which is always present in a stoichiometric excess. The resulting poly(alkylene oxide) ester glycol then polymerizes to form G units having the structure —DOOCCH$_2$(OCH$_2$CH$_2$CH$_2$CH$_2$)$_x$OCH$_2$COOD— in which each diol cap (D) may be the same or different depending on whether more than one diol is used. These dicarboxylic acids may also react in situ with the long chain glycol, in which case a material is obtained having a formula the same as above except that the D's are replaced by G's, the polymeric residue of the long chain glycol. The extent to which this reaction occurs is quite small, however, since the low molecular weight diol is present in considerable excess.

Polyester glycols can also be used as the long chain glycol. In using polyester glycols, care must generally be exercised to control the tendency to interchange during melt polymerization. Certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene, 1,4-cyclohexanedicarboxylate) can be utilized under normal reaction conditions, and other more reactive polyester glycols can be used if proper reaction conditions, including a short residence time, are employed.

Suitable long chain glycols also include polyformals prepared by reacting formaldehyde with glycols such as pentamethylene glycol or mixtures of glycols such as a mixture of tetramethylene and pentamethylene glycols. Polythioether glycols also provide useful products. Polybutadiene and polyisoprene glycols, copolymers of these, and saturated hydrogenation products of these materials are also satisfactory long chain polymeric glycols. In addition, the glycol esters of dicarboxylic acids formed by oxidation of polyisobutylene-diene copolymers are useful raw materials. The preferred long chain glycols are poly(alkylene ether) glycols and glycol esters of poly(alkylene oxide) dicarboxylic acids.

Butanediol is used in the preparation of the hard segments of copolyester elastomers. The term "butanediol", as used herein, should be construed to include equivalent ester-forming derivatives such as tetrahydrofuran or butanediacetate. The polytetramethylene ether glycols used to prepare the soft segments of these copolyester elastomers must have molecular weights of about 600 to 3500, and preferably about 600 to 2100.

The relative molecular weight of the segmented copolyester is expressed herein in terms of melt index, which is an empirical measurement of inverse melt viscosity. The segmented copolyester elastomers should have a melt index of less than about 150, less than about 30 for the soft elastomers, in order to provide useful compositions. The lower melt indices provide compositions having superior pressure sensitive properties. The melt indices specified herein are determined by the American Society for Testing and Materials (herein abbreviated "ASTM") test method D 1238-65T using Condition L at 230° C. (melt indices of soft elastomers were determined using Condition E at 190° C.) with a 2160 gram load.

The segmented copolyester, in one embodiment, has a melting point of at least about 125° C. and preferably a melting point of at least about 140° C. (DTA). The soft elastomers have a melting point of about 90° to 160° C., preferably 95° to 140° C. (TMA). The high melting segmented copolyesters used herein maintain their high melting characteristics when blended with low molecular weight thermoplastic resins in accordance with this invention.

The high melting point of the segmented copolyester is obtained by providing the polyester with crystallizable short chain ester segments. Crystallinity in the short chain ester segments is increased by the use of more linear and symmetrical diacid illustrated with aromatic diacids. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a non-linear and unsymmetrical aromatic diacid, such as isophthalic acid, is added to crystallizable short chain ester segments, their melting point is depressed. Small amounts of isophthalic acid are, however, very useful for controlling the melting point and improving the compatibility of segmented copolyesters with low molecular weight thermoplastic resins. In preparing the harder copolyester elastomers aliphatic dibasic acids should be avoided since they give low melting or non-crystalline short chain ester segments without any significant beneficial effects.

The melting points specified herein are determined by differential thermal or thermomechanical analysis. In differential thermal analysis (DTA) the melting point is read from the position of the endotherm peak in a thermogram when the sample is heated from room temperature at the range of 10° C./min. The details of this method are described in many publications, for example, by C. B. Murphy in *Differential Thermal Analysis*, R. C. Mackenzie, Editor, Volume I, Pages 643 to 671, Academic Press, New York, 1970. In thermomechanical analysis (TMA) the melting point is determined by measuring penetration of a penetrometer type probe into a polymer sample at 10 grams load with the temperature programmed at 5° C./min. The details of this method are described in many publications, for example, in *Du Pont Technical Literature for Model 941 Thermomechanical Analyzer*, Du Pont Co., Wilmington, Del., Oct. 1, 1968.

Preferred segmented copolyester elastomers are those in which the aromatic dicarboxylic acid is of 8 to 16 carbon atoms, the low molecular weight diol is aliphatic diol of 2 to 8 carbon atoms, the long chain glycol is poly(alkylene ether) glycol in which the alkylene group is of 2 to 9 carbon atoms, the short chain ester units amount to about 30 to 65 percent by weight of the copolyester, the long chain ester units amount to about 35 to 75 percent by weight of the copolyester, and the copolyester has a melt index of less than about 50 and a melting point of at least about 140° C. (DTA).

The copolyester elastomers prepared from terephthalic acid, or a mixture of terephthalic and isophthalic acids, 1,4-butanediol and polytetramethylene ether glycol having a molecular weight of about 600 to 3000 are particularly preferred in the compositions of this invention. The raw materials are readily available, and the adhesive and coating properties of compositions obtained from such polymers are outstanding.

The copolyester elastomers used in the compositions of this invention can be made by conventional condensation polymerization procedures, as for example, in bulk or in a solvent medium which dissolves one or more of the monomers. They are conveniently prepared by a conventional ester interchange reaction. A preferred procedure involves heating, for example, the dimethyl ester of terephthalic acid, or a mixture of terephthalic and isophthalic acids, with a long chain glycol which may be polytetramethylene ether glycol and an excess of a short chain diol which may be butanediol in the presence of a catalyst at 150° to 260° C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester of this invention.

These propolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate diacids, anhydrides, or acid chlorides, for example, with diols or by other processes such as reaction of the diacids with cyclic ethers or carbonates. Obviously the prepolymer can also be prepared by carrying out these processes in the presence of the long chain glycol.

The resulting prepolymer is then converted to the high molecular weight segmented copolyester elastomer by distillation of the excess of short chain diol. Best results are usually obtained if this final distillation is carried out at less than 1 mm. pressure and 240°–260° C. for less than 2 hours in the presence of an antioxidant such as sym-di-beta-naphthyl-p-phenylenediamine or 1,3,5-trimethyl-2,4,6-tris[3,5-ditertiary-butyl-4-hydroxybenzyl] benzene.

Most practical polymerization techniques rely upon ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures and lithium and magnesioum alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by batch and continuous methods. The preferred method for continuous polymerization; namely, ester interchange with a prepolymer, is a well-established commercial process.

The segmented copolyester elastomers have high molecular weights. Gel permeation chromatography methods can be used to determine the number average and weight average molecular weights. One such method utilizes a four column system, $10^6$, $10^5$, $10^4$, $10^3$ Angstrom units pore size packed with Styrogel ®. The system is calibrated using polystyrene samples, the solvent being 1,2,4-trichlorobenzene at 135° C., and the feed rate 1 milliliter per minute. The number average molecular weight is in excess of 10,000 and the weight average molecular weight is in excess of 25,000.

In addition to the segmented copolyester, the compositions of this invention contain one or more low molecular weight thermoplastic resins which form compatible mixtures with the segmented copolyester, are thermally stable at about 150° C., and have melt viscosities of less than about 10,000 centipoises at 200° C. The term "thermoplastic resin", as used throughout the specification and claims, is intended to include heat softenable resins, both natural and synthetic, as well as waxy types of materials. By the term "compatible" it is meant that there is no separation into distinct layers between the segmented copolyester and the low molecular weight resin or resins at the copolyester melt temperature. In some cases this compatibility is achieved in multi-component blends even though one of the low molecular weight thermoplastic resin components may not be compatible with the segmented copolyester elastomer alone. By the phrase "thermally stable", it is meant that there is no significant permanent alteration in the properties of the resin after heating at the specified temperature for one hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, rosin based alkyd resins, phenolic resins, chlorinated aliphatic hydrocarbon waxes, chlorinated polynuclear aromatic hydrocarbons, and the like.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology", Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkylaromatic resins" fall into this classification.

The term "styrene polymers" refers to low molecular weight homopolymers of styrene as well as copolymers containing styrene and other comonomers such as alpha-methyl-styrene, vinyl toluene, butadiene, and the like when prepared from substantially pure monomer.

The term "vinyl aromatic polymers" refers to low molecular weight homopolymers of vinyl aromatic monomers such as styrene, vinyl toluene, and alphamethyl styrene, copolymers of two or more of these monomers with each other, and copolymers containing one or more of these monomers in combination with other monomers such as butadiene, and the like. These polymers are distinguished from petroleum resins in that they are prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances", 6th Edition, Volume 1, Chapter 2, Van Nostrand Co., Inc., particularly Table III on Page 60.

The term "coal tar pitches" refers to the residues obtained by the partial evaporation or distillation of coal tar obtained by removal of gaseous components from bituminous coal. Such pitches include gas-works coal tar pitch, coke-oven coal tar pitch, blast-furnace coal tar pitch, producer-gas coal tar pitch, and the like. These pitches are fully described in Abraham's "Asphalts and Allied Substances", supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters and the like. These materials are fully described in the Kirk-Othmer Encyclopedia, supra, Volume 17, Pages 475 to 505.

The term "rosin based alkyd resins" refers to alkyd resins in which all or a portion of the monobasic fatty acid is replaced by rosin (a mixture of diterpene resin acids and non-acetic components). Unmodified alkyd resins are polyester products composed of polyhydric alcohol, polybasic acid and monobasic fatty acid. Rosin based alkyd resins are described in the Kirk-Othmer Encyclopedia, supra, Volume 1, Pages 851, 865 and 866.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waxes" refers to those waxes which are commonly called "chlorinated waxes" such as chlorinated paraffin waxes. These waxes typically contain about 30–70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

The compositions of this invention contain about 1 to 99 percent by weight of thermoplastic segmented copolyester elastomer and about 1 to 99 percent by weight of low molecular weight thermoplastic resin. Preferably, the composition contains about 5 to 95 percent by weight of thermoplastic segmented copolyester elastomer and about 5 to 95 percent by weight of low molecular weight thermoplastic resin.

Typically the compositions of this invention contain more than one low molecular weight thermoplastic resin. For example, low molecular weight vinyl aromatic polymers, e.g., styrene polymers, have been found to lower the melt viscosity of these compositions without substantially lowering the softening point. Since low melt viscosity contributes improved wetting by the composition of the surface of the substrate, which results in better adhesion, many useful compositions will contain some vinyl aromatic polymer. Vinyl aromatic polymers such as styrene are also useful for increasing the compatibility of other resins with the segmented copolyester elastomer. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion. The low molecular weight thermoplastic resins also have the effect of lowering the cost of the composition.

To improve adhesion, particularly at high temperatures and under high applied stress, it has been found that to the segmented copolyester elastomer or the thermoplastic composition, as the case may be, there is added 0.75 to 20 parts by weight, preferably 1.0 to 8.0 parts by weight per 100 parts by weight of segmented copolyester or 0.3 to 8.0 parts by weight, preferably 0.4 to 3.2 parts by weight per 100 parts by weight of thermoplastic composition, respectively, of the multifunctional carboxylic compound taken from the group consisting of aromatic and aliphatic anhydrides having at least two anhydride groups. Suitable multi-functional anhydrides include pyromellitic dianhydride (PMDA) (1,2,4,5-benzenetetracarboxylic-1,2:4,5-dianhydride), 1,4,5,8-naphthalenetetracarboxylic-1,8:4,5-dianhydride (NTCDA), 3,3',4,4'-benzophenonetetracarboxylic-3,4:3',4'-dianhydride (BTCDA), 1,2,3,4,-cyclopentanetetracarboxylic-1,2:3,4-dianhydride (CPTCDA), styrene/maleic anhydride copolymer resins (e.g., "Arco" SMA 2000A), 2,3,6,7-naphthalenetetracarboxylic-2,3:6,7-dianhydride, 2,2',3,3'-benzophenonetetracarboxylic2,3,2',3'-dianhydride, 1,2,3,4-cyclobutane tetracarboxylic-1,2:3,4-dianhydride, 1,2,4,5-cyclohexanetetracarboxylic-1,2:4,5-dianhydrides, etc., as well as other isomers of said anhydrides. The adhesion promoter is incorporated into the elastomer or the thermoplastic composition by melt blending during compounding of the adhesive.

Preferably the adhesion-modified elastomer or the thermoplastic composition is stabilized by adding 1.75 to 15.0 parts per 100 parts by weight of segmented copolyester or 0.75 to 6.0 parts per 100 parts by weight of thermoplastic composition, respectively, a stabilizer mixture comprising (a) a substantially linear polycarbodiimide having an average of at least two carbodiimide groups per molecule; and at least one compound taken from the group consisting of (b) a compound taken from the group consisting of hindered phenols, nitrogen-containing hindered phenols, and secondary aromatic amines; (c) phosphorous acid esters of the formula

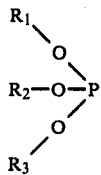

where $R_1$, $R_2$ and $R_3$ are $C_1$ to $C_{18}$ aliphatic, $C_6$ to $C_{15}$ aromatic, and combinations thereof; and (d) an amino compound taken from the group consisting of amino acrylate of the formula

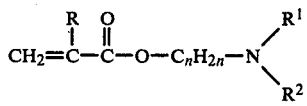

where R is hydrogen or methyl, $R^1$ is hydrogen or alkyl of 1 to 4 carbon atoms, $R^2$ is alkyl of 1 to 4 carbon atoms, and n is an integer of 1 to 4 inclusive, a homopolymer of said amino acrylate, and a random copolymer of ethylene and 20 to 40 percent by weight of the amino acrylate compound, each of compounds (b), (c) and (d) being compatible with each other and with (a). At least two of the compounds (b), (c) and (d) can be present with (a) to form the stabilizer mixture, or preferably all four compound types are present and are compatible with one another. By compatible in this context is meant that the various compounds of the stabilizer mixture retain their individual identity when mixed and do not chemically combine with one another.

Components (a), (b), (c) and (d) are present, respectively, in 0.25 to 2.5, 0.50 to 2.5, 0.5 to 5.0, and 0.5 to 5.0 parts per 100 parts by weight of segmented copolyester elastomer. When based on 100 parts by weight of the thermoplastic composition, i.e., the segmented copolyester elastomer and resin, the parts by weight of components (a), (b), (c), and (d) are 0.1 to 1.0; 0.2 to 1.0; 0.25 to 2.0; and 0.2 to 2.0, respectively.

The linear polycarbodiimide (a) of the stabilizer mixture is represented by the formula $$X_1-R_1-[N=C=N-R_2]_n-N=C=N-R_3-X_2$$

where $R_1$, $R_2$, and $R_3$ are $C_1$-$C_{12}$ aliphatic, $C_6$-$C_{15}$ cycloaliphatic, or $C_6$-$C_{15}$ aromatic divalent hydrocarbon radicals, and combinations thereof; $X_1$ and $X_2$ are H,

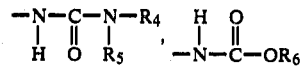

where $R_4$, $R_5$, and $R_6$ are $C_1$-$C_{12}$ aliphatic, $C_5$-$C_{15}$ cycloaliphatic and $C_6$-$C_{15}$ aromatic monovalent hydrocarbon radicals and combinations thereof and additionally $R_4$ or $R_5$ can be hydrogen; and n is a number of at least 1, preferably 1 to 7. The useful polycarbodiimides have an average of at least two carbodiimide groups (i.e., two —N=C=N—groups) per molecule and an average molecular weight of less than about 500 per carbodiimide group. These polycarbodiimides can be aliphatic, cycloaliphatic, or aromatic polycarbodiimides. The terms aliphatic, cycloaliphatic, and aromatic as used herein indicate that the carbodiimide group is attached directly to an aliphatic group, a cycloaliphatic group, or an aromatic nucleus respectively. For example, these carbodiimides can be illustrated by the formula $X_1-R_1-[N=C=N-R_2]_n-N=C=N-R_3-X_2$ wherein $R_1$, $R_2$, and $R_3$ are independently aliphatic, cycloaliphatic, or aromatic divalent hydrocarbon radicals and n is at least 1 and preferably 1–7. $X_1$ and $X_2$ are defined as hereinbefore. Polycarbodiimides useful for the compositions of this invention have more than two polycarbodiimide groups and thus more than three divalent hydrocarbon groups (i.e., $R_1$, $R_2$, $R_3$ ... $R_n$) and each of these hydrocarbon groups can be the same or different from the others so that the polycarbodiimides can have aliphatic, cycloaliphatic, and aromatic hydrocarbon groups in one polycarbodiimide molecule.

Polycarbodiimides can be prepared for use in this invention by well-known procedures. Typical procedures are described in U.S. Pat. No. 3,450,562 to Hoeschele; No. 2,941,983 to Smeltz; No. 3,193,522 to Neumann et al.; and No. 2,941,966 to Campbell.

Generally, polycarbodiimides are prepared by polymerization of organic diisocyanates. The isocyanate groups on a diisocyanate molecule polymerize with isocyanate groups on other diisocyanate molecules so that the resulting polycarbodiimide molecule is a linear polymer of organic radicals (i.e., aliphatic, cycloaliphatic, aromatic, or combinations thereof) linked together by carbodiimide groups (i.e., —N=C=N—). The degree of polymerization and the specific diisocyanate determine the molecular weight of the polycarbodiimide and the average molecular weight per carbodiimide group.

Many known organic isocyanates can be polymerized to produce polycarbodiimides useful for stabilized compositions of this invention. Isocyanates which can be polymerized to produce preferred aromatic polycarbodiimides include:
tolylene-2,4-diisocyanate,
tolylene-2,6-diisocyanate,
α,4-tolylene diisocyanate,
1,3- and 1,4-phenylene diisocyanates,
4,4'-methylenebis(phenyl isocyanate),
5-chlorotolylene-2,4-diisocyanate,
1,5-naphthylene diisocyanate,
1,6-hexamethylene diisocyanate,
4,4'-methylenebis(cyclohexyl isocyanate),
1,3- and 1,4-cyclohexylene diisocyanates,
1,3-diisopropylphenylene-2,4-diisocyanate,
1-methyl-3,5-diisopropylphenylene-2,4-diisocyanate,
1,3,5-triethylphenylene-2,4-diisocyanate,
triisopropylphenylene-2,4-(2,6-diisocyanate.

Diisocyanates, such as tolylene-2,4-diisocyanate or mixtures thereof with minor amounts of tolylene-2,6-diisocyanate and 4,4'-methylenebis(phenyl isocyanate), can be used to produce preferred unhindered aromatic polycarbodiimides which have only partial ortho substitution on the aromatic nuclei to which polycarbodiimide groups are attached. Diisocyanates such as triisopropylphenylene-1,3-diisocyanate yield preferred hindered aromatic polycarbodiimides.

Polymerization of diisocyanates to produce polycarbodiimides of a given degree of polymerization can be controlled by introducing agents which will cap the terminal isocyanate groups. These agents include monoisocyanates and active hydrogen compounds such as alcohols or amines. Polyisocyanates and other agents which will produce cross-linking of the polycarbodiimide generally should be avoided as cross-linking can reduce solubility and lead to blending problems with the copolyester. Preferably, isocyanate polymerization should be stopped to produce polycarbodiimides having average molecular weights in the range of about 600–2500 and 2–8 carbodiimide linkages. Polycarbodiimides in this preferred range can be readily mixed with copolyester and are sufficiently nonvolatile to prevent loss by vaporization.

The average number of carbodiimide groups per molecule can be estimated for a given polycarbodiimide from the proportions of the reactants employed in its preparation. As described elsewhere, the degree of polymerization of the polycarbodiimide can be controlled by employing capping agents. Alternatively, the average number of carbodiimide groups per molecule in a given polycarbodiimide can be calculated from its molecular weight (obtained by vapor phase osmometry or ebulliscopic procedures) and its assay for carbodiimide groups [determined by the method of Campbell and Smeltz, J. Org. Chem., 28, 2069–2075 (1963)].

A particularly preferred polycarbodiimide is sold under the tradename Stabaxol® PCD by Mobay Chemical, Pittsburgh, Pa.

Component (b) of the stabilizer mixture can be either a hindered phenol, a nitrogen-containing hindered phenol or a secondary amine. Useful hindered phenols include: 2,6-ditertiary-butyl-p-cresol; 4,4'-bis(2,6-ditertiarybutylphenol); 4,4',4''-(2,4,6-trimethyl-5-phenyl) trimethylene) tris 2,6-di-tert.-butyl phenol; 1,3,5-trimethyl-2,4,6-tris[3,5-ditertiarybutyl-4-hydroxybenzyl] benzene; 4,4'-butylidene bis(6-tertiary-butyl-m-cresol); α,α'-oxybis(2,6-di-tert.-butyl-p-cresol; 2,6-di-tert.-butyl-α-methoxy-p-cresol; 2,6 bis(5-tert.-butyl-4-hydroxy-m-tolyl) mesitol (Plastanox® 80); 4,4'-methylene-bis(2,6-di-tert.-butylphenol) [Ethyl® AO 702, Ionox® 220]; 2,2'-methylene-bis-(6-tert.-butyl-4-methyl) phenol; 4,4'-(tetramethyl-p-phenylene) dimethylene-bis-2,6-di-tert.-butyl phenol; 2,2',6,6'-tetra-tert.-butyl-p,p' biphenol; 3,5-ditert.-butyl-4-hydroxy benzyl alcohol; 4,4'-isopropylidine-bis-butylated phenol; 2,5-ditert.-butyl hydroquinone, 2,2'-methylenebis(6-tert-butyl-4-methyl phenol); 2,2'-methylenebis(6-tert-butyl-4-ethyl phenol); 2,2'-methylenebis [4-methyl-6-(1,1,3,3-tetramethyl)butyl phenol]; 4,4'bis(2-tert-butyl-5-methyl phenol) sulfide; 4,4'-butylidene-bis(2-tert-butyl-5-methyl phenol); 2,2'-methylenebis(4,6-dimethyl phenol); 2-tert-butyl-4(4-tert-butyl phenyl)phenol; 2-tert-butyl-4-phenyl phenol; 2,6-dibenzyl-4-methyl phenol; 2-benzyl-4-methyl phenol; 2-benzyl-6-tert-butyl-4-methyl phenol; 2-benzyl-6-tert-butyl-4-ethyl phenol; 2,4-dimethyl-6-(1-methyl-1-cyclohexyl) phenol, 2,6-diisopropyl-4-methyl phenol; 2,4-dimethyl-6-isopropyl phenol; 2-tert-butyl-4,6-dimethyl phenol; 2-tert-butyl-4-methyl phenol; 2-(1,1,3,3-tetra-methyl butyl)-4-methyl phenol; 2,4,6-trimethyl phenol; 2,6-di-tert-butyl-4-methyl phenol; 2,6-di-tert-butyl-4-ethyl phenol; 4-phenyl phenol 2,6-diisopropyl phenol; 2,6-di-tert-butyl-4-phenyl phenol; 2,6-di-tert-butyl-4(4-tert-butyl-phenyl)phenol; 2,5-di-tert-butyl-hydroquinone; 2,5-di-tert-amyl-hydroquinone, and alpha-conidendrine. Mixtures of the foregoing may be used. The preferred hindered phenol is tetrakis[methylene-3-(3',5'-ditertiary-butyl-4'-hydroxyphenyl) propionate] methane.

Suitable nitrogen-containing hindered phenols include 2,6-di-tert-butyl-α-dimethylamino-p-cresol; 4-hydroxydodecananilide; 4-hydroxy butyranalide; p-butylaminophenol; 2,4-bis[n-octylthio]-6[4'-hydroxy-3,5' ditertiary butyl anilino]-1,3,5-triazine. A preferred compound is CHA 1014 sold by Ciba-Geigy, Ardsley, N.Y., described in Example 10.

Useful secondary amine compounds are 4,4'-dioctyl diphenylamine; diethyl dinonyl diphenylamine; 4-isopropoxy diphenylamine; N,N'-diphenyl-1,2-propanediamine; octylated diphenylamine; p-isopropoxydiphenylamine; phenyl-α-naphthylamine; phenyl β-naphthylamine; N,N'-diphenylethylene diamine; N',N'-di-o-tolylethylene diamine; N',N'-diphenyl-1,2-propylene diamine; N,N'-diphenyl-p-phenylene diamine. A preferred secondary amine is N,N'-di-2-naphthylparaphenylenediamine sold by Vanderbilt Chemical Co., Nashville, Tenn.

Component (c) of the stabilizer mixture is a phosphorus acid ester including trioctyl phosphite, pentyl triphosphite, trilauryl phosphite, triisodecyl phosphite, diphenyl isooctyl phosphite, (2-ethylhexyl)octyl-phenyl phosphite, tris(2-ethylhexyl) phosphite, triphenyl phosphite, trimethyl phosphite, triethyl phosphite, diphenyl-p-(α-methylbenzyl) phenyl phosphite, tributyl phosphite, phenyl-di(isodecyl) phosphite, tri-tetrahydrofurfuryl phosphite, di(isodecyl)-2-ethylphenyl phosphite, tri-secondarybutyl phosphite, tri-tertiarybutyl phosphite, trihexyl phosphite, tricyclohexyl phosphite, diphenyl-lauryl phosphite, phenyl-dilauryl phosphite, trinaphthyl phosphite. A preferred compound is tri(-nonylphenyl phosphite) sold by Argus Chemical Corp., Brooklyn, N.Y. under the tradename Mark® 1178.

Component (d) of the stabilizer mixture is either an amino acrylate, a homopolymer of the amino acrylate, or a random copolymer of ethylene and the amino acrylate. Suitable amino acrylates include N,N-dimethylaminoethyl acrylate, aminoethyl acrylate, N-methylaminoethyl acrylate, N,N-butylaminoethyl acrylate, N,N-di-n-butylaminoethyl acrylate, N,N-dimethylaminobutyl acrylate, dimethylamino propyl acrylate, N,N'-diisopropylaminoethyl acrylate. The methacrylates of these compounds can also be used. N,N-dimethylaminoethyl methacrylate is preferred. When the copolymer is used, ethylene is present in an amount of 60 to 80 percent by weight and the amino acrylate or methacrylate in an amount of 40 to 20 percent by weight. A preferred ratio of ethylene to amino acrylate is 70:30 percent by weight.

The properties of the compositions of this invention can be modified by the incorporation of various conventional inorganic fillers such as wood flour, silicates, silica gel, alumina, clays, chopped fiberglass, titanium dioxide, carbon black, and the like. In general, fillers have the effect of increasing the melt viscosity and the modulus or stiffness of the composition at various elongations.

The properties of the compositions of this invention can be further modified by the incorporation of thermally stable thermoplastic polymers of ethylenically unsaturated monomers including homopolymers of vinyl esters such as vinyl acetate, copolymers of these vinyl esters with other vinyl monomers such as ethylene, vinyl chloride and the like, and polymers of alkyl acrylates and methacrylates, or thermally stable condensation polymers such as polyesters and polyamides, and the like. For example, the addition of a copolymer of ethylene and vinyl acetate often increases the tackiness of pressure sensitive adhesive compositions of this invention. These modifying polymers typically have melt viscosities above about 10,000 centipoises at 200° C. and thus are not low molecular weight thermoplastic resins as defined herein.

The compositions can also be colored by the addition of organic or inorganic pigments or organic dyes where their effect is desired. Suitable inorganic pigments include rutile and anatase titanium dioxides, aluminum powder, cadmium sulfides and sulfo-selenides, lead antimonate, mercury cadmiums, chromates of nickel, tin and lead, ceramic greens such as chromium, cobalt, titanium and nickel oxides, ceramic blacks such as chromium, cobalt and iron oxides, carbon black, ultramarine blue, and the like. Suitable organic pigments include phthalocyanine blues and greens, quinacridones, and the like. Suitable dyes include disperse dyes such as Colour Index Disperse Blues 59, 63 and 64. Optical brightner such as "Uvitex" CF, sold by Ciba Corp., and "Tinopal" AN, sold by Geigy Chemical Corp., may also be incorporated where their effect is desired.

Plasticizers including phthalate esters such as dioctyl phthalate, and aryl phosphates such as tricresyl phosphate, and substituted sulfonamides such as N-cyclohexyl-p-toluene-sulfonamide and the like, may be added for applications where their effect is desired. Flame retardant additives, such as zinc borate, antimony trioxide, tris(2,3-dichloropropyl) phosphate, tris(2,3-dibromopropyl) phosphate, chlorinated waxes, and the like may be added, if desired. Other minor additives such as surfactants or lubricants may also be added.

One of the important advantages of the thermoplastic compositions of this invention is that the copolyester elastomers and the low molecular weight thermoplastic resins are easy to blend together due to the relatively low melt viscosity of these compositions at elevated temperatures as compared to compositions of the prior art having comparable bond strength. The components of the compositions of this invention can be blended by variously well-known procedures such as, for example, blending in molten form, blending in a solvent, or mixing aqueous dispersions of the components. Blending in the melt may be carried out by first melting the adhesion-modified, stabilized segmented copolyester elastomer and then adding low molecular weight thermoplastic resin to the melt, by first melting the low molecular weight thermoplastic resin and then adding adhesion-modified, stabilized segmented copolyester elastomer to the melt, or by first blending the segmented copolyester elastomer and the low molecular weight thermoplastic resin together in finely divided form and then melting the blend, for example, on a hot roller mill or by simultaneously feeding the components to an extruder. The stabilizing compounds and/or adhesion-promoter can be present prior to blending or can be added with the other components individually or as a mixture.

In addition to these blending procedures, it is also possible to take the copolyester from the synthesis step and, while it is still molten, blend solid, premelted, or liquid low molecular weight thermoplastic resin with it. The adhesion modifying compounds as well as other ingredients such as stabilizers, antioxidants, fillers, plasticizers, and the like can also be added at this time. This blending process can be carried out with an in-line mixer or with a separate mixing vessel, and has the advantage that it does not require isolation of the copolyester.

The thermoplastic compositions of this invention can also be blended by dissolving the segmented copolyester and the low molecular weight thermoplastic resin in a solvent. Suitable solvents for preparing these solutions include chlorinated hydrocarbons such as methylene chloride, chloroform, trichloroethylene, solvent mixtures such as mixtures of trichloroethylene and isopropanol, and the like.

Aqueous dispersions of the thermoplastic compositions of this invention can be prepared by dissolving the segmented copolyester and the low molecular weight thermoplastic resin together in a suitable water-immiscible organic solvent, emulsifying the organic solvent containing the segmented copolyester and the low molecular weight thermoplastic resin in water, and removing the organic solvent as described by Funck and Wolff in U.S. Pat. No. 3,296,172. Dispersions can also be prepared by dissolving the segmented copolyester in a suitable water-immiscible organic solvent, dissolving the low molecular weight thermoplastic resin in a different water-immiscible organic solvent, emulsifying each organic solvent solution in water, removing the organic solvent from each emulsion, thereby forming separate dispersions, and mixing the dispersions together in proper amounts.

Compositions containing about 50 percent by weight or more of segmented copolyester elastomer can be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester elastomer itself. For example, a mixture containing an equal weight of segmented copolyester elastomer and low molecular weight, thermoplastic styrene homopolymer is typically blended at a minimum temperature of about 170° C. However, additional low molecular weight thermoplastic resins can be mixed with this concentrate at a minimum blending temperature of about 140° C. Moreover, additional low molecular weight thermoplastic resins which have limited compatibility with the segmented copolyester elastomer alone tend to be more compatible with such concentrates.

The compositions of this invention are useful as adhesives and as coating compositions. These compositions can be applied in the form of a dry blend, a solution, an aqueous dispersion, or in molten form. The softer compositions are useful as pressure sensitive adhesives which can be applied in the form of a solution, an aqueous dispersion, or in molten form. The method of application does not appreciably affect the performance of the composition.

Conventional application equipment can be used for applying the compositions of this invention in the various forms. For application of solutions or dispersions, as in the case of heat sealing and pressure sensitive adhesives, various known application techniques can be used including brushing, dipping, roll coating, wire-wound rod application, doctoring, printing, and the like. Spraying or curtain coating techniques are also applicable to these forms of the compositions.

For application of these compositions in the melt form, dipping, roll coating, calendaring, curtain coating, extruding, hot spraying, and other hot melt application techniques can be used. Powder coatings of appropriate nontacky compositions can also be applied by known fluidized bed techniques, electrostatic powder spray application, or plasma spraying.

In using the compositions of this invention as hot melt adhesives, the joining step can be accomplished by applying the molten composition to one surface, bringing the other surface into contact with the molten composition, and allowing the bond to cool. Coatings of these compositions can be bonded to other surfaces or themselves by heat or solvent activation of the coating, and contacting the activated coating with the second surface and allowing the bond to cool or the solvent to evaporate. Heat activation of the coating is typically carried out in an oven or using an infrared lamp. Simultaneous application of heat and pressure, or heat sealing, can be used with these compositions to accomplish bonding. Commercially available, edge banding and surface laminating machinery can also be employed to apply adhesives described herein and to prepare laminates therewith. High frequency dielectric and ultrasonic waves can also be used to activate these compositions to effect bonding.

The compositions of this invention are characterized by an outstanding combination of properties. These compositions have demonstrated improved adhesion to many substrates including difficulty adherable substrates such as melamine-formaldehyde laminated plastics ("Formica"). They have high temperature bond strengths, for example, as shown by failure temperatures higher than about 70° C. as measured by the programmed temperature cleavage test described below. They have good low temperature flexibility, that is, resistance to breakage on impact.

Due to the presence of the stabilizing mixture the compositions have good pot life when heated to 170° to 200° C. for extended periods of time within the period of 12 to 24 hours.

The compositions containing up to 50 percent by weight of segmented copolyester elastomer are particularly useful as hot melt adhesives in a wide variety of adhesive use applications, specifically for edge banding and surface lamination, for example, in furniture manufacture, vinyl lamination, sole attachment and box-toe construction in shoe assembly.

Compositions containing about 50 percent or more by weight of thermoplastic segmented copolyester elastomer are particularly useful in the preparation of molded, extruded, and dipped goods, coating, binders, extruded adhesives, sealants, and the like. Films can be prepared from these compositions by molding, extrusion and calendaring techniques. These compositions typically contain about 50 to 99 percent by weight of segmented copolyester elastomer and about 1 to 50 percent by weight of low molecular weight thermoplastic resin. Preferably they contain about 50 to 95 percent by weight of segmented copolyester elastomer and about 5 to 50 percent by weight of low molecular weight thermoplastic resin.

EXAMPLES OF THE INVENTION

The following examples illustrate the invention. Ring and ball softening points can be determined by ASTM method E 28-67. Bond Preparation of Particle Board/

Melamine Formaldehyde Laminates

Test samples used in the examples are prepared from precut pieces of particle board, 2.54 cm. wide × 2.54 cm. thick × 10.16 cm. long, and precut strips of melamine-formaldehyde laminate, 1.9 cm. wide × 0.16 cm. thick × 5.08 cm. long. Adhesive is melted under an infrared lamp or on a temperature-regulated hot plate, and approximately 0.5 g. is applied to a 1.9 cm. × 1.9 cm. area at one end of the particle board strip, and laminate is formed while hot to the room temperature melamine strip in the form of a lap joint. Depending on the intended end use, the adhesive is applied either to the cut edge or surface of the particle board. Lamination is accomplished with the application of pressure to provide intimate contact and to achieve the goal adhesive thickness of 0.13±0.025 mm on the surface and 0.254±0.025 mm on the edge. The excess adhesive fillet is carefully trimmed from the test sample, which is allowed to age at least overnight before testing.

Shear and Cleavage tests were performed as follows:

Programmed Temperature Shear

This test is an adaptation of test method WPS-68 described by W. Schneider and D. Fabricius in the German periodical "Adhaesion", January, 1969, Pages 28-37.

Thermal testing of the bonded sample is carried out by suspending it in shear configuration in a circulating air oven held at 50° C. (122° F.). A weight of 0.45 kg. is applied to the end of the melamine strip after the sample has been heated for 0.5 hours. The temperature of the oven is programmed to increase linearly from 50° C. (122° F.) at a rate of 10° C. (18° F.) per hour. The failure temperature is recorded when the weight falls. The method is adapted to an automated procedure by incorporation of a temperature programmer and a temperature recorder for the oven; and for each sample, an elapsed time indicator which is switched off by the falling weight.

Programmed Temperature Cleavage

Samples for this test are prepared in a manner identical to that for the Programmed Temperature Shear Test. Thermal testing of the aged sample is again carried out in a circulating air oven, with the adhesive-bonded area in a horizontal configuration and the melamine laminate on the bottom. A 0.45 kg. weight is suspended from the melamine strip 2.54 cm from the edge of the bonded area. The oven temperature is again programmed linearly, but this time from room temperature at a rate of 10° C. (18° F.) per hour, and the failure temperature is taken when the weight falls.

EXAMPLE 1

A semistructural adhesive blend was prepared by blending the following materials at 175° C. with vigorous stirring for approximately 1 hour until homogeneous:

Block Copolyester—40 g.

Piccovar ® L-30—20 g.
Piccolastic ® A-50—20 g.
Piccoumaron ® 410HL—20 g.
Pyromellitic Dianhydride (PMDA)—1 g.
Naugard ® 445 4,4'-bis(α,α'-dimethylbenzyl) diphenyl amine—0.5 g.

The block copolyester is prepared as follows:
Into a 3000 ml. resin kettle fitted for distillation was placed:
Polytetramethylene Ether Glycol (PTMEG); Number Average Molecular Weight 1000—446.0 g.
1,4-Butanediol (BDO)—296.9 g. (50% Excess)
Dimethyl Terephthalate (DMT)—399.3 g.
Dimethyl Isophthalate (DMI)—115.9 g.
Naugard ® 445 4,4'-bis(α,α'-dimethylbenzyl) diphenyl amine—9.9 g.
Tyzor ® TBT (Tetrabutyltitanate, 5% Solution in BDO)—1.0 g.

The reaction kettle was heated to 150° C. at atmospheric pressure at which time the catalyst was charged. The reaction was then heated to 250° C. under a nitrogen atmosphere over a period of 1 hour. Methanol distillation started almost immediately. When the temperature reached 250° C., a vacuum of 160 mm. was applied and held for 5 minutes, after which the pressure was further reduced to 80 mm. for 5 minutes, 40 mm. for 5 minutes, and finally to full vacuum (0.5 mm. of Hg or less) and distillation was continued at full vacuum at 250° C. for 1 hour. The resulting viscous molten product was scraped from the flask in a nitrogen ($H_2O$ and $O_2$ free) atmosphere and allowed to cool.

The block copolyester is sold by E. I. du Pont de Nemours and Company and is characterized by a melt index (2160 g./200° C.) of 6-8, a TMA S.P. of 144° C. and a DTA crystalline M.P. of 154° C. The 1,4-butanediol/PTMEG mole ratio is 5.0 and the dimethylterephthalate to total phthalate ratio is 0.78.

Piccovar ® L-30 is a polyindene petroleum resin having a softening point of 30° C. sold by Hercules, Inc. "Piccolastic" A-50 is a low molecular weight styrene homopolymer having a ring and ball softening point of about 50° C. and a melt viscosity of 29 centipoises at 190° C. sold by Hercules, Inc. "Piccoumaron" 410HL is a highly aromatic polyindene type hydrocarbon resin having a ring and ball softening point of 110° C. and a melt viscosity of 158 centipoises at 190° C. sold by Hercules, Inc. Pyromellitic diahydride is supplied by E. I. du Pont de Nemours and Company, Inc. "Naugard" 4,4'-bis(α,α'-dimethylbenzyl) diphenyl amine, is an antioxidant sold by Naugatuck Chemical Company, a division of Uniroyal Company. "Tyzor" TBT is tetrabutyltitanate sold by E. I. du Pont de Nemours and Company, Inc.

Particle board/melamine-formaldehyde laminates were prepared as described above. Shear and cleavage results are recorded in Table I. Failure mode was cohesive. A 25.4 cm.×25.4 cm. particle board/"Formica" (0.16 cm. thick) laminate prepared from the adhesive composition of this example survived greater than two weeks at 70° C. without substrate delamination whereas a laminate prepared from an adhesive composition not containing an adhesion promoter delaminated in less than 1 hour at 70° C.

EXAMPLE 2

A composition similar to that described in Example 1 was prepared except that only 0.5 g. of PMDA was added, Naugard ® 445 was omitted, and the following stabilizers were added:
Stabaxol ® PCD—0.25 g.
E/DMAEMA Resin—1.0 g.
Irganox ® 1010—1.0 g.
Mark ® 1178—1.0 g.

Stabaxol ® PCD is a mixture of hindered aromatic polycarbodiimides having an average molecular weight of about 1000 containing units of

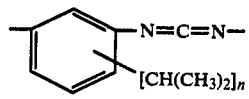

where n has an average value of about 3 sold by Naftone, Inc., New York, N.Y.; Irganox ® 1010 is a tetrakis[methylene-3-(3',5'-ditertiary-butyl-4'-hydroxyphenol) propionate] methane high melting phenolic antioxidant sold by Geigy Chemical Co.; Mark ®1178 is tris nonyl phenyl phosphite sold by Argus Chemical Corporation, Brookyln, N.Y.

E/DMAEMA resin is a copolymer of ethylene (70%) and N,N-dimethylaminoethyl methacrylate (30%).

Cleavage test value for a laminate using the adhesive composition is listed in Table I. Failure mode was cohesive.

EXAMPLE 3

A composition similar to that described in Example 2 was prepared except tht 1.0 g. of cyclopentanetetracarboxylic dianhydride, CPTCDA, was added in place of the PMDA, and 1.0 g. Stabaxol ® PCD was used.

Cleavage test value for a laminate using the adhesive composition is listed in Table I. Failure mode was cohesive.

EXAMPLE 4

A composition similar to that described in Example 3 was prepared except that 1.0 g. naphthalene tetracarboxylic dianhydride, NTCDA, was added in place of CPTCDA.

Cleavage test value for a laminate using the adhesive composition is listed in Table I. Failure mode was cohesive.

EXAMPLE 5

A composition similar to that described in Example 3 was prepared except that 1.0 g. of benzophenone tetracarboxylic dianhydride, BTCDA, was used in place of CPTCDA.

Cleavage test value for a laminate using the adhesive composition is listed in Table I. Failure mode was cohesive.

EXAMPLE 6

A composition similar to that described in Example 3 was prepared except that 2.0 g. of benzophenone tetracarboxylic dianhydride was used in place of CPTCDA.

Cleavage test value for a laminate using the adhesive composition is listed in Table I. Failure mode was cohesive.

EXAMPLE 7

A composition similar to that described in Example 2 was prepared except that 5.0 g. of Arco ® SMA 1000A resin (a styrene/maleic anhydride copolymer available from Atlantic Richfield Company) was added in place of the PMDA, and 1.5 g. of the E/DMAEMA resin was added instead of 1.0 g.

Cleavage and shear test values for laminates using the adhesive composition are listed in Table I. Failure mode was cohesive.

EXAMPLE 8

A composition similar to that described in Example 7 was prepared except that 5.0 g. of Arco® SMA 17352A resin (a styrene/maleic anhydride copolymer available from Atlantic Richfield Company) was added in place of the anhydride copolymer of Example 7.

Cleavage and shear test values for laminates using the adhesive composition are listed in Table I. Failure mode was cohesive.

EXAMPLE 9

A semistructural adhesive blend was prepared by blending the following materials at 175° C. with vigorous stirring for approximately 1 hour until homogeneous:

Block Copolyester of Example 1—40 g.
Nevillac® X-66—13.3 g.
Nevillac® SH—13.3 g.
Piccoumaron® 410HL—6.7 g.
BaSO$_4$—27 g.
Pyromellitic Dianhydride (PMDA)—1.0 g.
Stabaxol® PCD—0.25 g.
E/DMAEMA Resin—1.0 g.
Mark® 1178—2.0 g.
Irganox® 1010—1.0 g.

Nevillac® X-66 (softening point 10° C.) and Nevillac® SH (softening point 100°-110° C.) are both phenol modified coumarone indene resins available from Neville Chemical Company.

Cleavage and shear test values for laiminates using the adhesive composition are listed in Table I. Failure mode was cohesive.

EXAMPLE 10

A composition similar to that described in Example 9 was prepared except that 2.5 g. of the E/DMAEMA resin and 1.0 g. Mark® 1178 were used.

Cleavage and shear test values for laminates using the adhesive composition are listed in Table I. Failure mode was cohesive.

EXAMPLE 11

A composition similar to that described in Example 9 was prepaed except that 3.5 g. of the E/DMAEMA resin and 2.5 g of Mark® 1178 were used.

Cleavage and shear test values for laminates using the adhesive compositon are listed in Table I. Failure mode was cohesive.

EXAMPLE 12

A semistructural adhesive blend was prepared by blending the following materials at 175° C. with vigorous stirring for approximately 1 hour until homogeneous:

Block Copolyester of Example 1—35 g.
Piccovar® L-30—35 g.
Piccolastic® A-50—30 g.
Pyromellitic Dianhydride (PMDA)—1.0 g.
Stabaxol® PCD—0.25 g.
E/DMAEMA Resin—1.5 g.
Mark® 1178—1.0 g. Irganox® 1010—1.0 g.

Cleavage test value for a laminate using the adhesive composition is listed in Table I. Failure mode was cohesive.

EXAMPLE 13

A semistructural adhesive blend was prepared by blending the following materials at 175° C. with vigorous stirring for approximately 1 hour until homogeneous.

Block Copolyester of Example 1—45 g.
Nevillac® X-66—25 g.
Piccourmaron® 410HL—30 g.
Pyromellitic Dianhydride (PMDA)—1.0 g.
Stabaxol® PCD—0.25 g.
E/DMAEMA Resin—1.5 g.
Mark® 1178—1.0 g.
Irganox® 1010—1.0 g.

Cleavage test value for a laminate using the adhesive composition is listed in Table I. Failure mode was cohesive.

EXAMPLE 14

A composition similar to that described in Example 2 was prepared except that 1.5 g. of the E/DMAEMA resin was used. Adhesive was applied and laimiates were prepared by means of a Salgo (Stiles Manufacturing) Surface Laminator. Cleavage and shear test values for laminates using the adhesive composition are listed in Table I, shear being extremely high. Failure mode was cohesive.

EXAMPLE 15

Into a 1000 ml. resin kettle fitted for distillation was placed:

PTMEG—348.0 g.
1,4-Butanediol (BDO)—213.0 g.
Dimethyl Terephthalate (DMT)—316.0 g.
Dimethyl Adipate (DMA)—80.0 g.
Naugard® 445—3.45 g.
Tyzor® TBT (tetrabutyltitanate, 5% solution in BDO)—0.69 g.

The reaction kettle was heated to 190° C. at atmospheric pressure at which time the catalyst was charged. The reaction was then heated to 260° C. under a nitrogen atmosphere over a period of 1 hour. Methanol distillation started almost immediately. When the temperature reached 260° C. vacuum was reduced slowly to about 0.2 mm of mercury and distillation was continued at full vacuum at 260° C. for about 4 hours. The resulting viscous molten product was scraped from the flask in a nitrogen (H$_2$O and O$_2$ free) atmosphere and allowed to cool. The polymer was characterized by a melt index (2160 g. at 190° C.) of 3.6, a TMA S.P. of 145° C., and a DTA crystalline melting point of 157° C. The 1,4-butanediol/PTMEG ratio was 5.0 and the dimethylterephthalate to total dimethyl ester ratio was 0.78.

An adhesive as described in Example 2 was prepared except that 1.0 g. of PMDA, 1.5 g. of E/DMAEMA resin and an additional 4.75 g. of Piccoumaron® 410 HL were added.

Particle board/melamine-formaldehyde laminates were prepared as described in Example 1. Shear and Cleavage results are recorded in Table I. Failure mode was cohesive.

EXAMPLE 16 (Control)

A composition similar to that described in Example 1 was prepared except that pyromellitic dianhydride (PMDA) was omitted. Cleavage test value of the adhesive blend not containing an adhesion promoter is listed in Table I. Cleavage failure was extremely low. Failure mode was adhesive.

EXAMPLE 17 (Control)

A composition similar to that described in Example 2 was prepared except that 1.5 g. of E/DMAEMA resin was added and pyromellitic dianhydride (PMDA) was omitted.

Cleavage and shear test values for laminates using the adhesive composition are listed in Table I. Cleavage failure temperature was extremely low. Failure mode was adhesive.

TABLE I

| Example | Cleavage Value °C. | Shear Value °C. |
|---|---|---|
| 1 | 106 | >136 |
| 2 | 116 | — |
| 3 | 84 | — |
| 4 | 102 | — |
| 5 | 103 | — |
| 6 | 122 | — |
| 7 | 107 | 134 |
| 8 | 110 | 148 |
| 9 | 110 | 136 |
| 10 | 104 | 130 |
| 11 | 105 | 136 |
| 12 | 81 | — |
| 13 | 107 | — |
| 14 | 87 | 145 |
| 15 | 121 | 148 |
| (Control) 16 | 65 | — |
| (Control) 17 | 57 | 122 |

I claim:

1. An adhesion-modified thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

wherein R is the divalent radical remaining after removal of the carboxyl groups from a dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of 90° C., to 160° C. modified with 0.75 to 20 parts by weight, per 100 parts by weight of elastomer, of a multi-functional carboxylic compound taken from the group consisting of aromatic and aliphatic anhydrides having at least two anhydride groups.

2. The elastomer of claim 1 in which the adhesion modifier is pyromellitic acid dianhydride.

3. The elastomer of claim 1 in which the adhesion modifier is benzophenone tetracarboxylic dianhydride.

4. The elastomer of claim 1 in which R is selected from the group consisting of a divalent cyclic, aromatic, aliphatic radical or mixtures of said radicals remaining after removal of the carboxyl groups from a cyclic, aromatic, aliphatic dicarboxylic acid or mixture of said acids.

5. The elastomer of claim 4 in which R is a divalent aromatic radical remaining after removal of the carboxyl groups from an aromatic dicarboxylic acid.

6. The elastomer of claim 4 in which R is a mixture of divalent cyclic and aromatic radicals remaining after removal of the carboxyl groups from the mixture of cyclic and aromatic acids.

* * * * *